US009248522B2

(12) United States Patent
Saitou et al.

(10) Patent No.: US 9,248,522 B2
(45) Date of Patent: Feb. 2, 2016

(54) FRICTION STIR WELDING APPARATUS

(71) Applicants: F-TECH INC., Kuki, Saitama (JP); HONDA MOTOR CO., LTD., Tokyo (JP)

(72) Inventors: Tomoya Saitou, Tochigi (JP); Hiroyasu Yamaguchi, Kazo (JP); Yukio Shoji, Kazo (JP); Mitsuru Sayama, Wako (JP); Tsutomu Kobayashi, Wako (JP)

(73) Assignees: F-TECH INC., Kuki (JP); HONDA MOTOR CO., LTD., Tokyo (JP)

( * ) Notice: Subject to any disclaimer, the term of this patent is extended or adjusted under 35 U.S.C. 154(b) by 29 days.

(21) Appl. No.: 14/136,978

(22) Filed: Dec. 20, 2013

(65) Prior Publication Data

US 2014/0183246 A1    Jul. 3, 2014

(30) Foreign Application Priority Data

Dec. 28, 2012  (JP) ................................. 2012-288332

(51) Int. Cl.
*B23K 20/12*    (2006.01)

(52) U.S. Cl.
CPC ........... *B23K 20/1245* (2013.01); *B23K 20/123* (2013.01); *B23K 20/126* (2013.01)

(58) Field of Classification Search
CPC .......................... B23K 20/123; B23K 20/1245
USPC .................................. 228/112.1, 113, 114, 2.1
See application file for complete search history.

(56) References Cited

U.S. PATENT DOCUMENTS

| 6,888,089 | B2 | 5/2005 | Okanda et al. |
| 7,121,451 | B2 | 10/2006 | Kano et al. |
| 8,052,029 | B1 | 11/2011 | Sigler et al. |
| 2002/0134762 | A1 | 9/2002 | Okanda et al. |
| 2005/0029331 | A1 | 2/2005 | Kano et al. |

FOREIGN PATENT DOCUMENTS

| DE | 602004000458 T2 | 8/2006 |
| EP | 1 245 324 A1 | 10/2002 |
| EP | 1477263 A1 | 11/2004 |
| EP | 1477263 B1 | 3/2006 |
| EP | 1 245 324 B1 | 4/2007 |
| JP | 5-138361 A | 6/1993 |
| JP | 2989357 B2 | 12/1999 |
| JP | 2002-283059 A | 10/2002 |
| JP | 2002-346769 A | 12/2002 |

(Continued)

OTHER PUBLICATIONS

English computer translation of JP2002-346769A.*

(Continued)

*Primary Examiner* — Erin Saad
(74) *Attorney, Agent, or Firm* — Westerman, Hattori, Daniels & Adrian, LLP

(57) ABSTRACT

In a friction stir welding apparatus that can control a penetrating position of a probe with respect to a processing target member to an optimum position at a time of friction stir welding by detecting a wear volume and a tip position of the probe, as a drive mechanism moves down a holder having a coefficient of thermal expansion larger than that of the probe and holding the probe, a detector can freely detect a length of a member including the holder and the probe, and a probe detection mechanism can freely detect a tip length, which is the length of the member of only the probe.

14 Claims, 6 Drawing Sheets

(56) References Cited

FOREIGN PATENT DOCUMENTS

| | | | |
|---|---|---|---|
| JP | 2003-062757 A | 3/2003 |
| JP | 3498086 B1 | 2/2004 |
| JP | 2004-337891 A | 12/2004 |
| JP | 2007-30017 A | 2/2007 |
| JP | 2010-052039 A | 3/2010 |
| JP | 4690812 B2 | 6/2011 |
| JP | 5463476 B2 | 4/2014 |

OTHER PUBLICATIONS

English computer translation of JP2010052039A.*
English computer translation of JP2003062757A.*
English computer translation of JP2004337891A.*
Office Action dated Feb. 10, 2015, issued in Japanese Application No. 2012-288332, w/English translation (6 pages).
Office Action dated Jul. 7, 2015, issued in counterpart Chinese application No. 201310717863.6 (w/English translation) (10 pages).

* cited by examiner

FRICTION STIR WELDING APPARATUS

BACKGROUND OF THE INVENTION

The present invention relates to a friction stir welding apparatus, and more particularly relates to a friction stir welding apparatus having a probe detection mechanism, a processing-member detection mechanism, and a probe cleaning mechanism.

In recent years, there has been proposed a friction stir welding apparatus that performs friction stirring on a predetermined welding portion in a processing target component formed by a plurality of metal plates such as aluminum plates by a probe rotating at a high speed, in addition to general arc welding, to weld the metal plates with each other. Even in a strength component of a movable body such as an automobile, a configuration having a welding portion welded by a friction stir welding apparatus has been realized.

In such a friction stir welding apparatus, the rotating probe and the processing target component need to be moved relative to each other to weld a predetermined welding portion accurately. Accordingly, it is important to execute friction stir welding by detecting parameters required therefor with high accuracy, taking the detection values thereof into consideration.

Under such circumstances, although it is not related to a friction stir welding apparatus, Japanese Patent Application Laid-open Publication No. 2002-283059 discloses setting of a shaft reference position of a servo spot welding gun and a robot control apparatus therefor. The robot control apparatus has such a configuration that a movable welding tip of the welding gun is pressed against a fixed welding tip until an estimated disturbance load reaches a set first threshold, and when the estimated disturbance load has reached the first threshold, the movable welding tip is driven in a direction in which the both tips are away from each other until the estimated disturbance load reaches a second threshold smaller than the first threshold, to set, update, and store the shaft position of the movable welding tip when the second threshold is reached as a reference position, thereby enabling to obtain and update the reference position in the same manner even when the welding tip is worn off.

Japanese Patent Application Laid-open Publication No. 2007-30017 relates to a friction stirring welding method and discloses a configuration in which after a rotation jig is moved to a temporary setting position determined based on deflection amount data of a support table generated when a welding pressure is applied and thickness data of an overlapped portion, position control of a servo motor is canceled at the temporary setting position and torque of the servo motor is controlled. After a certain time has passed since the start of torque control, a moving distance of the rotation jig is measured, to obtain a welding operation start position based on the obtained moving distance and the temporary setting position, and then a friction stir welding operation with respect to the overlapped portion is performed by using the welding operation start position as a reference.

Japanese Patent Application Laid-open Publication No. H5-138361 relates to a nozzle cleaning apparatus of a welding torch, although it is not related to a friction stir welding apparatus. The nozzle cleaning apparatus includes a pre-processing device 10 in which a plurality of long wires 12 having a tip bent inward and a plurality of short wires 13 having a tip formed in an outward hook shape are erected on a circumference slightly smaller than an opening end diameter of a nozzle 7 of a fixed table 11, and a main processing device 20 in which a plurality of long brushing bars 22 and short brushing bars 23 having fine wires implanted at the end thereof are erected on a circumference slightly smaller than the opening end diameter of the nozzle 7 of a turntable 21 and a cylindrical wire brush 24 is provided in a standing condition outside thereof, thereby eliminating spatters near a gas outlet 9 and circular spatters at the opening end of the nozzle 7.

SUMMARY OF THE INVENTION

According to the studies performed by the present inventors, Japanese Patent Application Laid-open Publication No. 2002-283059 discloses the configuration that enables to obtain and update the reference position in the same manner even when the welding tip is worn off is disclosed. However, there is no disclosure as to how to obtain the size of the probe to be used for friction stir welding.

According to the studies performed by the present inventors, Japanese Patent Application Laid-open Publication No. 2007-30017 discloses the configuration in which deflection amount data of the support table and thickness data of the overlapped portion are used to obtain the welding operation start position. However, a surface position itself of the support table and an upper position itself of each member constituting the overlapped portion are not detected, and thus it is considered that there is still a room for improvement in setting of a value to be detected.

According to the studies performed by the present inventors, Japanese Patent Application Laid-open Publication No. H5-138361 discloses the configuration that enables nozzle cleaning of the welding torch. However, there is no disclosure as to how to execute the cleaning with respect to the rotatable probe.

Therefore, under present circumstances, a friction stir welding apparatus having a new configuration that can control a penetrating position of a probe with respect to a processing target member to an optimum position at the time of friction stir welding, by detecting a wear volume and a tip position of the probe, the position of a mounting surface of a mounting jig, and the position of a processing target side surface of the processing target member mounted on the mounting surface has been desired.

The present invention has been achieved in view of the above studies, and an object of the present invention is to provide a friction stir welding apparatus that can control a penetrating position of a probe with respect to a processing target member to an optimum position at a time of friction stir welding, by detecting a wear volume and a tip position of the probe, in an optimum mode for executing friction stir welding.

To achieve the above object, a first aspect of the present invention is to provide a friction stir welding apparatus comprising: a mounting member on which a processing target member is mounted; a welding tool having a probe, a holder having a coefficient of thermal expansion larger than that of the probe and holding the probe detachably, a drive mechanism that can drive the holder holding the probe to freely move the probe vertically with respect to a processing target side surface of the processing target member and can freely rotate with respect to the processing target member, and a detector that can freely detect a length of a member including the holder and the probe as the drive mechanism moves the holder holding the probe downward; a movement mechanism having an arm to which a fitting jig fitted with the welding tool is fixed so as to be able to freely move the welding tool with respect to the processing target member by moving the arm; and a probe detection mechanism that can freely detect a tip length, which is a length of a member of only the probe, as the drive mechanism moves the holder holding the probe downward.

According to a second aspect of the present invention, in addition to the first aspect, the probe detection mechanism has a block member whose position is fixed and a displacement sensor fixed to the block member side, and at a time of detecting the tip length of the probe, after the movement mechanism moves the arm so that the welding tool faces the block member, the drive mechanism moves down the holder holding the probe to press an upper surface side of the block member by a tip of the probe, and a contact member of the displacement sensor comes in contact with an abutment member of the welding tool and is moved, thereby detecting displacement of the contact member.

According to a third aspect of the present invention, in addition to the second aspect, the detector can freely detect an amount of vertical movement of the holder and the probe held by the holder by the drive mechanism, and detects the length of the member including the holder and the probe based on the amount of movement after the movement mechanism moves the arm so that the welding tool faces the block member until the holder holding the probe is moved down by the drive mechanism to press the upper surface side of the block member by the tip of the probe.

According to a fourth aspect of the present invention, in addition to the second or third aspect, the friction stir welding apparatus further comprising a supplementary support mechanism that supports the mounting member by a support member to supplementarily support only a vertical position of the processing target member, wherein the supplementary support mechanism is fitted to the arm, and at a time of detecting the length of the member including the holder and the probe and the tip length of the probe, the welding tool is moved down so that the tip of the probe presses the upper surface side of the block member, and the support member supports the lower surface side of the block member.

According to a fifth aspect of the present invention, in addition to any of the first to fourth aspects, the friction stir welding apparatus further comprising a probe cleaning mechanism that cleans the probe, wherein the probe cleaning mechanism has a roughing unit and a final polishing unit, and at a time of cleaning the probe, after the movement mechanism moves the arm so that the welding tool faces the roughing unit, the welding tool is moved down to accommodate the tip of the probe in the roughing unit, and the welding tool is rotated to rough the tip, and after the movement mechanism moves the arm so that the welding tool faces the final polishing unit, the welding tool is moved down to accommodate the tip of the probe in the final polishing unit, and the welding tool is rotated to polish the tip.

According to a sixth aspect of the present invention, in addition to any of the first to fifth aspects, the detector can freely detect the amount of vertical movement of the holder and the probe held by the holder by the drive mechanism, and detects the amount of movement after the movement mechanism moves the arm so that the welding tool faces a mounting surface of the mounting member until the welding tool is moved down to press the mounting surface of the mounting member by the tip of the probe.

According to a seventh aspect of the present invention, in addition to the sixth aspect, the friction stir welding apparatus further comprising a supplementary support mechanism that supports the mounting member by a support member to supplementarily support only a vertical position of the processing target member, wherein at a time of detecting the amount of movement after the movement mechanism moves the arm so that the welding tool faces the mounting surface of the mounting member until the welding tool is moved down to press the mounting surface of the mounting member by the tip of the probe, the welding tool is moved down to press the mounting surface of the mounting member by the tip of the probe and the support member supports an opposite side to the mounting surface of the mounting member.

According to an eighth aspect of the present invention, in addition to any of the first to seventh aspects, the friction stir welding apparatus further comprising: a pressing member that can freely press the processing target member mounted on the mounting member; and a processing-member detection mechanism having a displacement sensor fixed to the mounting member side, wherein when the pressing member presses an upper surface of the processing target member, the contact member of the displacement sensor comes in contact with the pressing member side and is moved, thereby detecting an amount of displacement of the contact member.

According to a ninth aspect of the present invention, in addition to the eighth aspect, the processing target member has a lower member and an upper member, and when the pressing member presses an upper surface of the lower member mounted on the mounting member, the contact member of the displacement sensor comes in contact with the pressing member side and is moved, thereby detecting the amount of displacement of the contact member, or when the pressing member presses an upper surface of the upper member mounted on the lower member, the contact member of the displacement sensor comes in contact with the pressing member side and is moved, thereby detecting the amount of displacement of the contact member.

According to a tenth aspect of the present invention, in addition to any of the first to ninth aspects, the probe detection mechanism, the processing-member detection mechanism, the probe cleaning mechanism, and the processing target member mounted on the mounting member are arranged within a movable range of the welding tool defined by the movement of the arm by the movement mechanism.

According to an eleventh aspect of the present invention, in addition to any of the first to tenth aspects, the movement mechanism is an industrial robot.

According to the configuration of the first aspect of the present invention, as the drive mechanism moves down the holder having the coefficient of thermal expansion larger than that of the probe and holding the probe, the detector can freely detect the length of the member including the holder and the probe, and the probe detection mechanism can freely detect the tip length, which is the length of the member of only the probe. Accordingly, because the length of the member including the holder and the probe reflects thermal expansion of the holder and wear of the probe, correction of an insertion amount of the probe into the processing target member at the time of friction stir welding to be performed by using the friction stir welding apparatus can be performed in an appropriate manner. Furthermore, because the tip length of the probe reflects only the wear of the probe, when the wear volume of the probe exceeds an upper limit, the probe can be appropriately replaced by a new probe. Consequently, the penetrating position of the probe with respect to the processing target member can be controlled to an optimum position at the time of friction stir welding, particularly by detecting the wear volume and the tip position of the probe, in an optimum mode for executing friction stir welding.

According to the configuration of the second aspect of the present invention, the probe detection mechanism has the block member whose position is fixed and the displacement sensor fixed to the block member side, and at the time of detecting the tip length of the probe, after the movement mechanism moves the arm so that the welding tool faces the block member, the drive mechanism moves down the holder holding the probe to press the upper surface side of the block member by the tip of the probe, and the contact member of the displacement sensor comes in contact with the abutment member of the welding tool and is moved, thereby detecting displacement of the contact member. Consequently, the wear volume and the tip position of the probe can be reliably detected, while reliably fixing the position of the probe at the time of executing detection with a simple configuration.

According to the configuration of the third aspect of the present invention, the detector can freely detect the amount of vertical movement of the holder and the probe held by the holder by the drive mechanism, and detects the length of the member including the holder and the probe based on the amount of movement after the movement mechanism moves the arm so that the welding tool faces the block member until the holder holding the probe is moved down by the drive mechanism to press the upper surface side of the block member by the tip of the probe. Consequently, the tip position of the probe can be reliably detected with a simple configuration.

According to the configuration of the fourth aspect of the present invention, the supplementary support mechanism that supports the mounting member by the support member to supplementarily support only the vertical position of the processing target member is provided. The supplementary support mechanism is fitted to the arm, and at the time of detecting the length of the member including the holder and the probe and the tip length of the probe, the welding tool is moved down so that the tip of the probe presses the upper surface side of the block member, and the support member supports the lower surface side of the block member. Consequently, at the time of executing friction stir welding, the probe and the processing target member can be positioned more accurately, thereby enabling to perform friction stir welding while reliably controlling the distance between the probe and the processing target member to a predetermined distance. Furthermore, the wear volume and the tip position of the probe can be detected more reliably, while fixing the position of the probe at the time of executing the detection more reliably.

According to the configuration of the fifth aspect of the present invention, the probe cleaning mechanism that cleans the probe is further provided. The probe cleaning mechanism has the roughing unit and the final polishing unit, and at the time of cleaning the probe, after the movement mechanism moves the arm so that the welding tool faces the roughing unit, the welding tool is moved down to accommodate the tip of the probe in the roughing unit, and the welding tool is rotated to rough the tip. Thereafter, after the movement mechanism moves the arm so that the welding tool faces the final polishing unit, the welding tool is moved down to accommodate the tip of the probe in the final polishing unit, and the welding tool is rotated to polish the tip. Consequently, the probe can be cleaned reliably by using rotation of the probe with a simple configuration.

According to the configuration of the sixth aspect of the present invention, the detector can freely detect the amount of vertical movement of the holder and the probe held by the holder by the drive mechanism, and detects the amount of movement after the movement mechanism moves the arm so that the welding tool faces the mounting surface of the mounting member until the welding tool is moved down to press the mounting surface of the mounting member by the tip of the probe. Consequently, the surface position of the mounting surface of the mounting member can be reliably detected with a simple configuration, without providing any additional sensor for detecting the mounting surface of the mounting member.

According to the configuration of the seventh aspect of the present invention, the supplementary support mechanism that supports the mounting member by the support member to supplementarily support only the vertical position of the processing target member is provided. At the time of detecting the amount of movement after the movement mechanism moves the arm so that the welding tool faces the mounting surface of the mounting member until the welding tool is moved down to press the mounting surface of the mounting member by the tip of the probe, the welding tool is moved down to press the mounting surface of the mounting member by the tip of the probe and the support member supports the opposite side to the mounting surface of the mounting member. Consequently, at the time of executing friction stir welding, the probe and the processing target member can be positioned more accurately, thereby enabling to perform friction stir welding while reliably controlling the distance between the probe and the processing target member to the predetermined distance. Furthermore, the surface position of the mounting surface of the mounting member can be detected more reliably with a simple configuration, without providing any additional sensor for detecting the mounting surface of the mounting member.

According to the configuration of the eighth aspect of the present invention, the pressing member that can freely press the processing target member mounted on the mounting member, and the processing-member detection mechanism having the displacement sensor fixed to the mounting member side are further provided. When the pressing member presses the upper surface of the processing target member, the contact member of the displacement sensor comes in contact with the pressing member side and is moved, thereby detecting the amount of displacement of the contact member. Consequently, a surface position of the processing target member in the state of being mounted on the mounting member can be further detected, and thus the penetrating position of the probe with respect to the processing target member can be controlled reliably to the optimum position at the time of friction stir welding.

According to the configuration of the ninth aspect of the present invention, the processing target member has the lower member and the upper member, and when the pressing member presses the upper surface of the lower member mounted on the mounting member, the contact member of the displacement sensor comes in contact with the pressing member side and is moved, thereby detecting the amount of displacement of the contact member, or when the pressing member presses the upper surface of the upper member mounted on the lower member, the contact member of the displacement sensor comes in contact with the pressing member side and is moved, thereby detecting the amount of displacement of the contact member. Consequently, the upper surface position of each of the constituent members of the processing target member in the state of being mounted on the mounting member can be respectively detected, and the penetrating position of the probe with respect to the processing target member can be controlled more reliably to the optimum position at the time of friction stir welding.

According to the configuration of the tenth aspect of the present invention, the probe detection mechanism, the processing-member detection mechanism, the probe cleaning mechanism, and the processing target member mounted on the mounting member are arranged within a movable range of the welding tool defined by the movement of the arm by the movement mechanism. Consequently, the overall configuration of the friction stir welding apparatus can be maintained compact, and further, the wear volume and the tip position of the probe, the surface position of the mounting surface of the mounting member, and the surface position of the processing target member in the state of being mounted on the mounting member can be detected, while necessarily cleaning the probe, in a mode with high positional consistency between the constituent elements.

According to the configuration of the eleventh aspect of the present invention, the movement mechanism is an industrial robot. Consequently, the probe can be moved accurately with respect to the probe detection mechanism, the probe cleaning mechanism, and the processing target member mounted on the mounting member with a more general purpose configuration.

DETAILED DESCRIPTION OF THE PREFERRED EMBODIMENT

Figure 1:
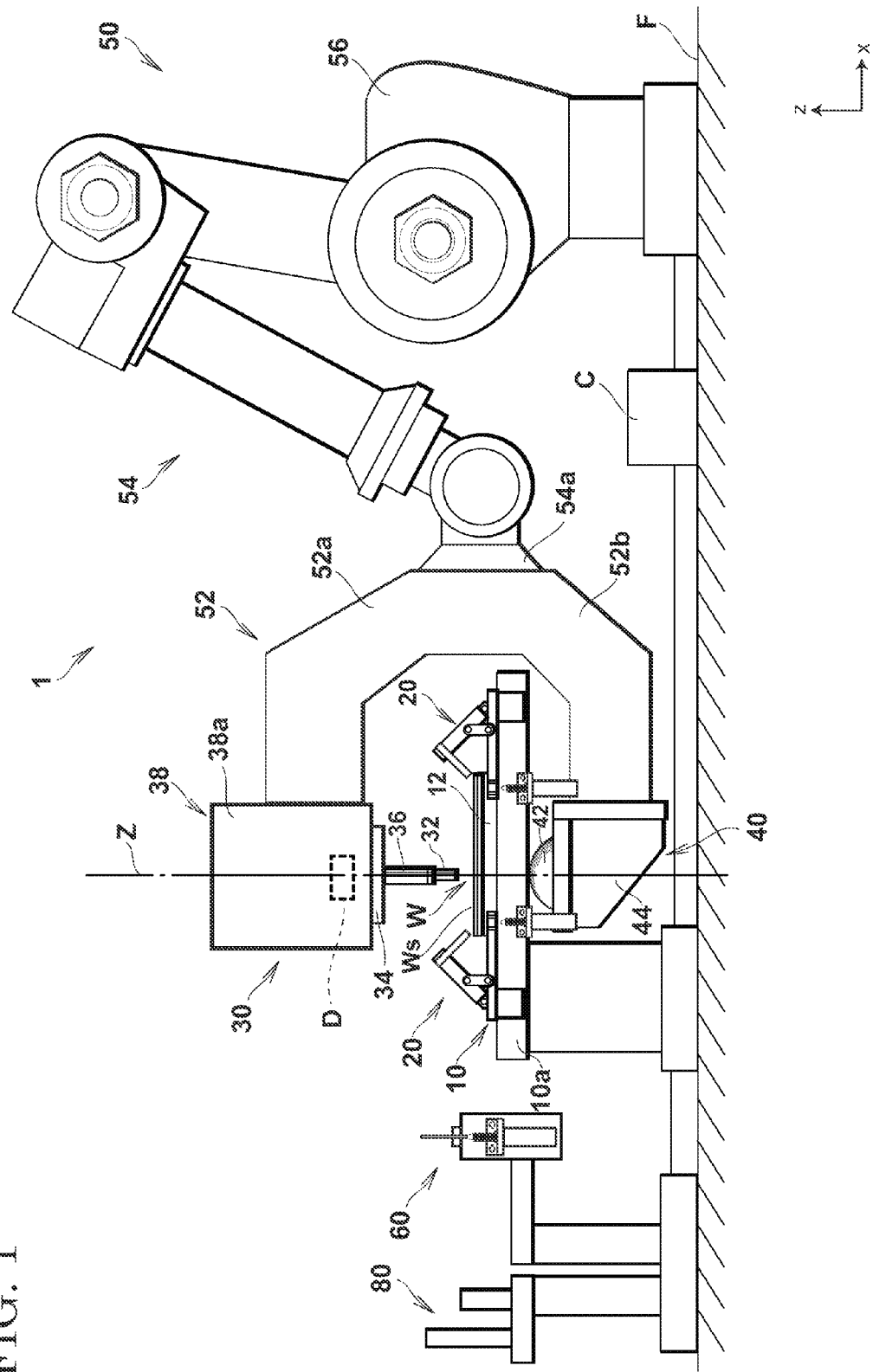
FIG. 1 is a side view showing an overall configuration of a friction stir welding apparatus according to an embodiment of the present invention.

A friction stir welding apparatus according to an embodiment of the present invention is explained in detail below with reference to the accompanying drawings. In the drawings, an x-axis, a y-axis, and a z-axis constitute a three-axis orthogonal coordinate system. A plane defined by the x-axis and the y-axis is parallel to a horizontal plane, and a normal direction of the z-axis is an upward direction.

A configuration of the friction stir welding apparatus according to the present embodiment is explained in detail with reference to FIGS. 1 to 7.

Figure 2:
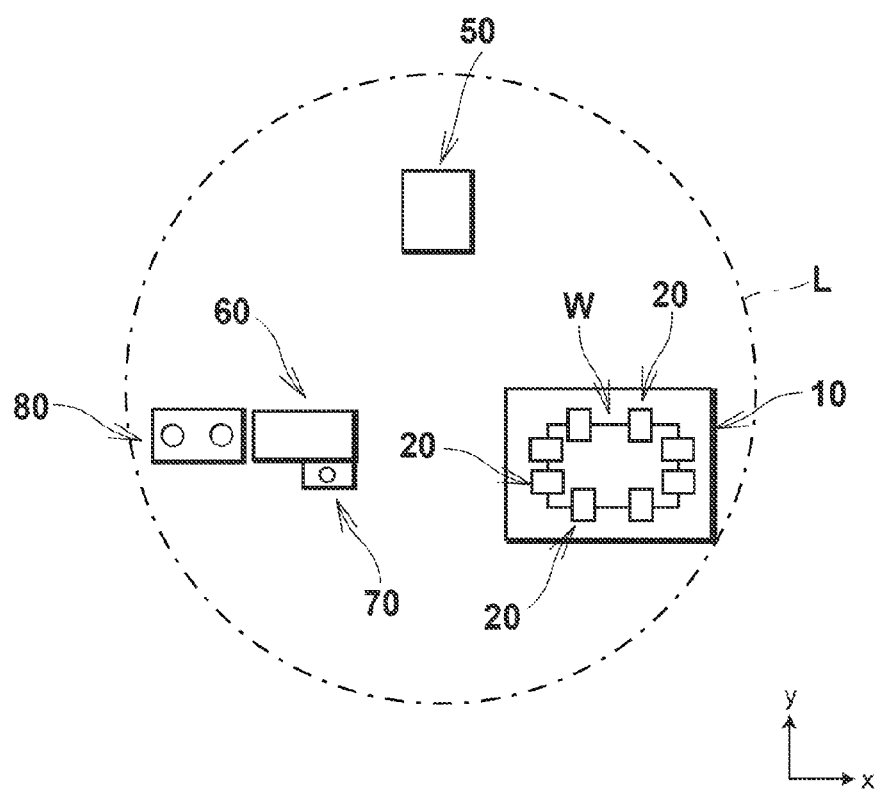
FIG. 2 is a schematic top view showing an arrangement range of respective constituent elements of the friction stir welding apparatus according to the embodiment.
Figure 3:
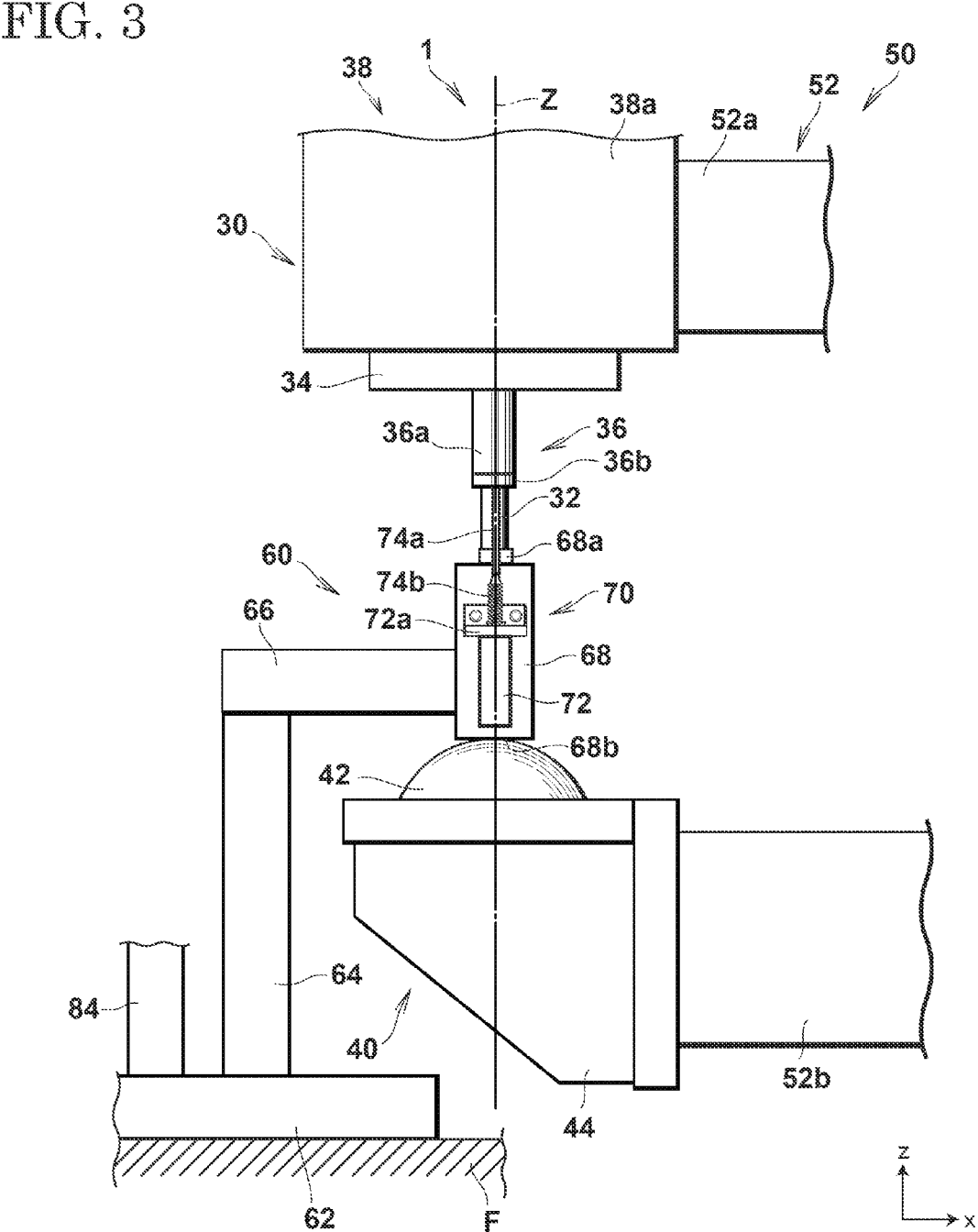
FIG. 3 is a partial enlarged side view showing a probe detection mechanism of the friction stir welding apparatus according to the embodiment.
Figure 4:
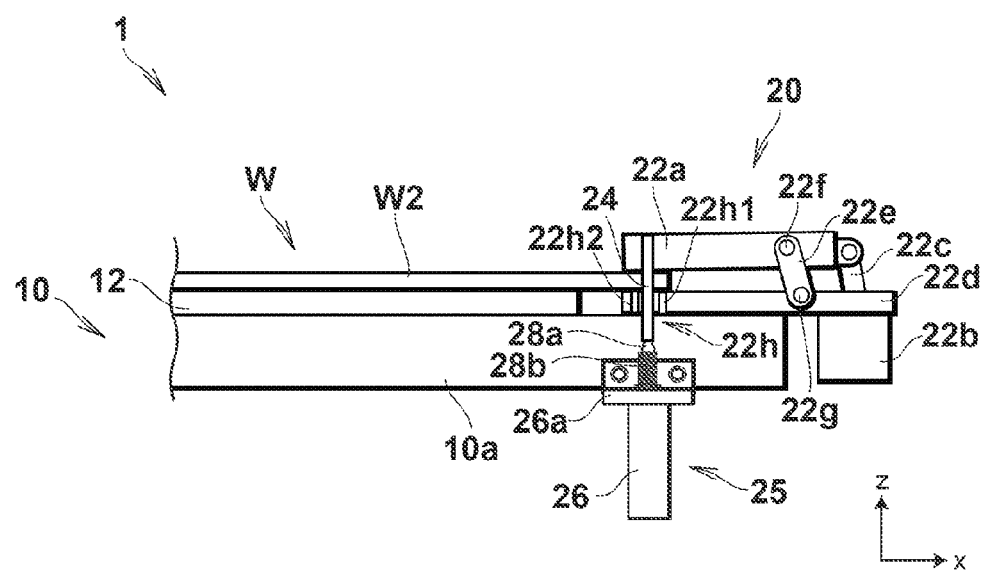
FIG. 4 is a partial enlarged side view showing a processing-member detection mechanism of the friction stir welding apparatus according to the present embodiment, showing a state where only a first member is mounted on a mounting jig.
Figure 5:
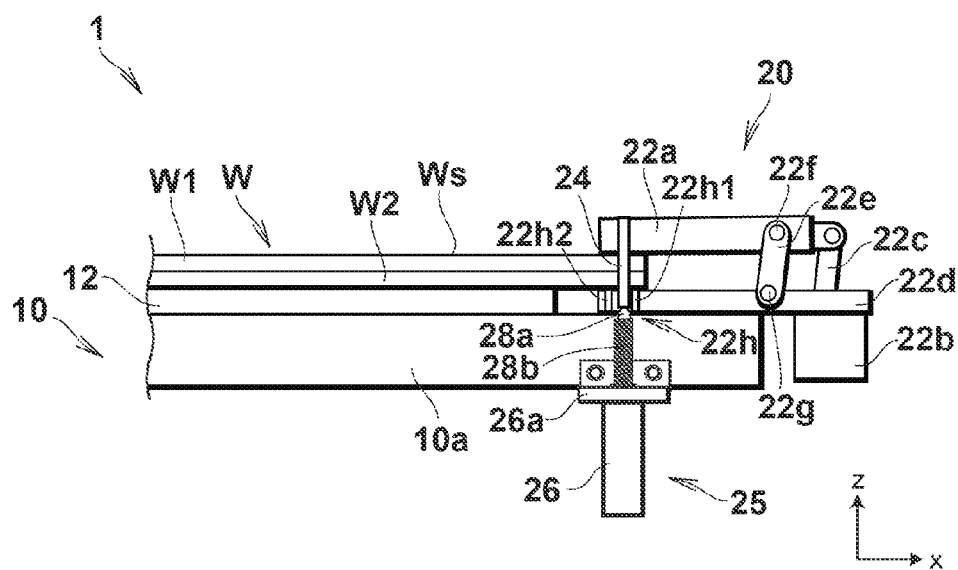
FIG. 5 is a partial enlarged side view showing the processing-member detection mechanism of the friction stir welding apparatus according to the present embodiment, showing a state where both the first member and a second member are mounted on the mounting jig.
Figure 6:
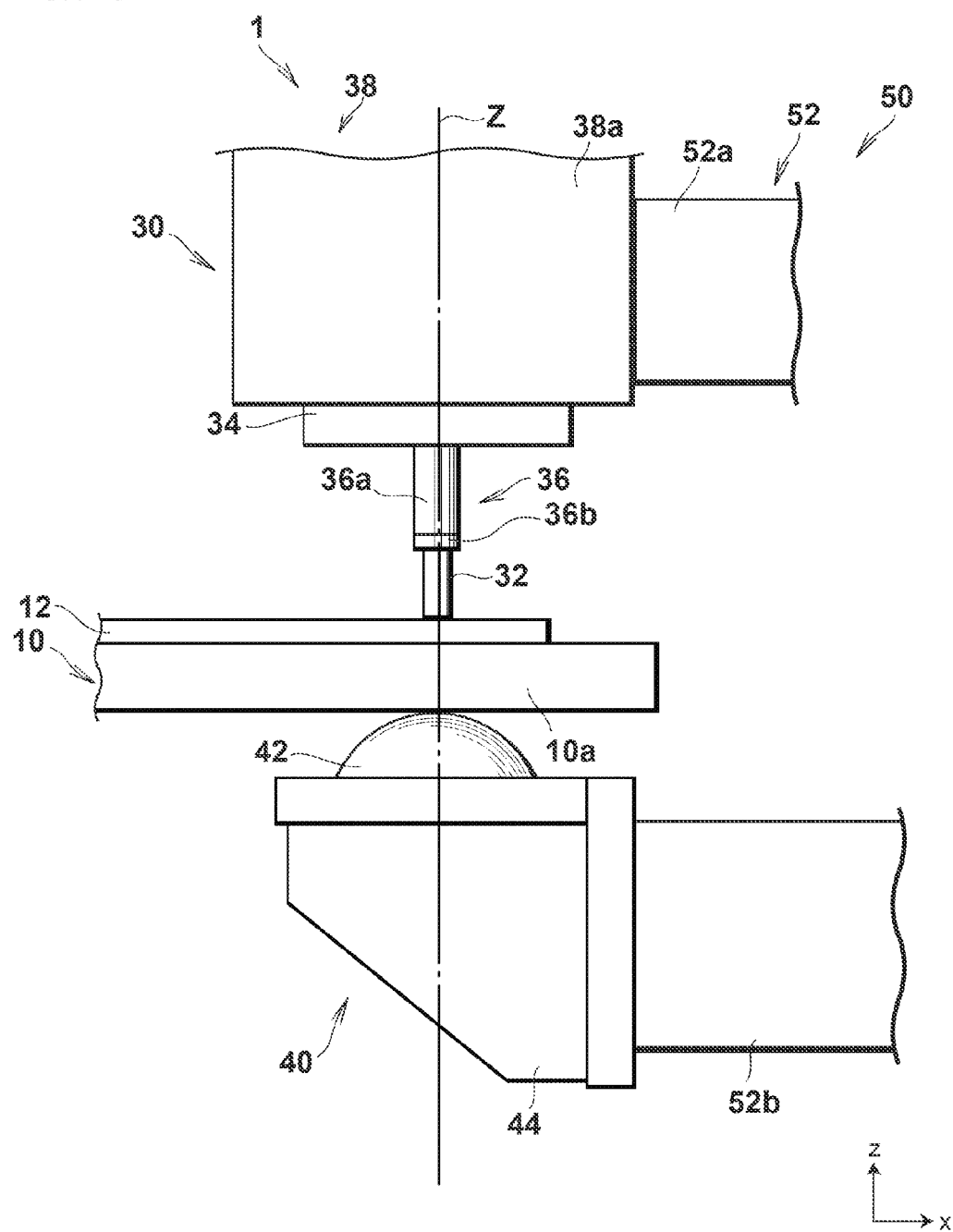
FIG. 6 is a partial enlarged side view showing a state where a probe of a welding tool of the friction stir welding apparatus according to the embodiment presses the mounting jig.
Figure 7:
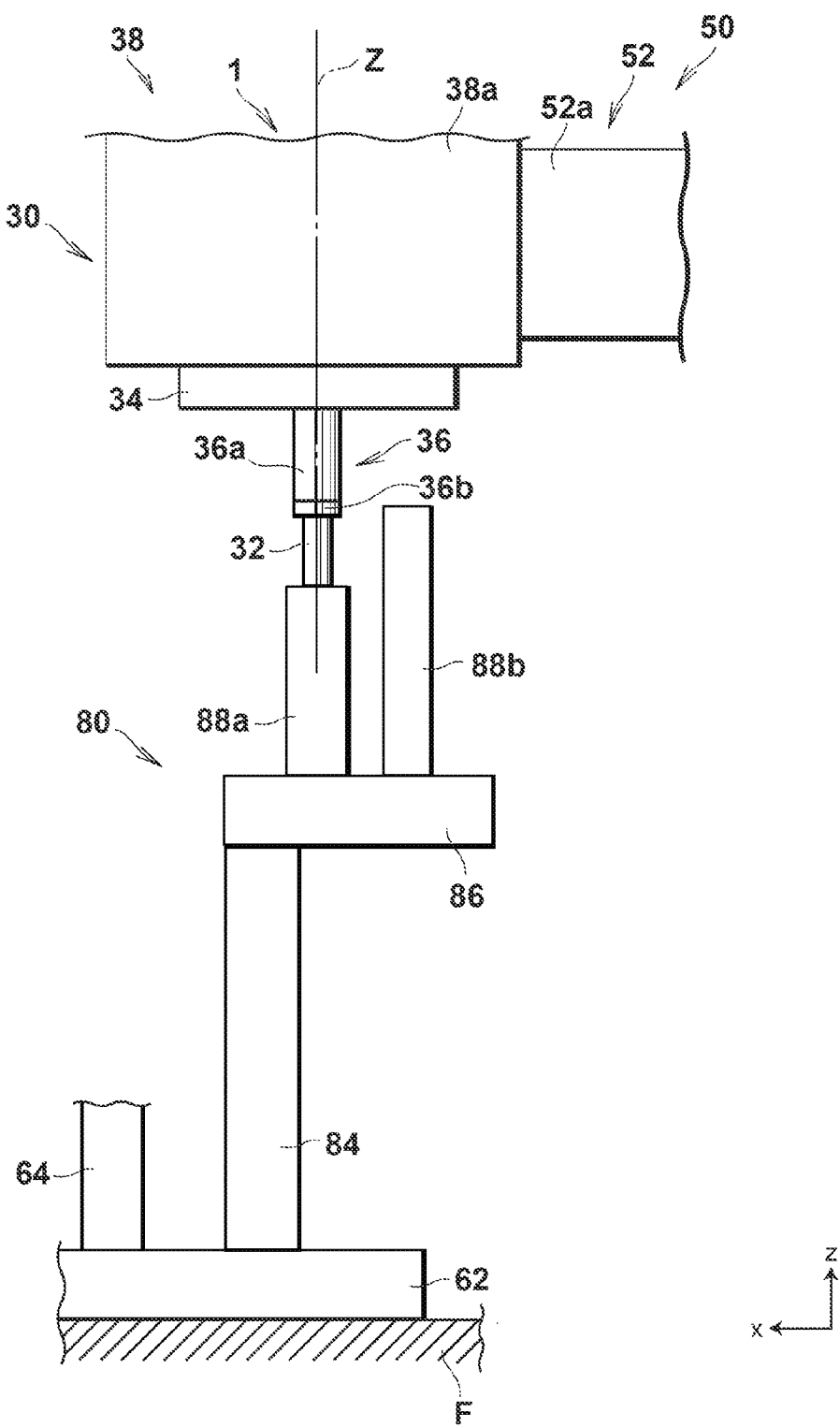
FIG. 7 is a partial enlarged side view showing a probe cleaning mechanism of the friction stir welding apparatus according to the embodiment.

FIG. 1 is a side view showing an overall configuration of the friction stir welding apparatus according to the present embodiment. FIG. 2 is a schematic top view showing an arrangement range of respective constituent elements of the friction stir welding apparatus according to the present embodiment. FIG. 3 is a partial enlarged side view showing a probe detection mechanism of the friction stir welding apparatus according to the present embodiment. FIG. 4 is a partial enlarged side view showing a processing-member detection mechanism of the friction stir welding apparatus according to the present embodiment, showing a state where only a first member is mounted on a mounting jig. FIG. 5 is a partial enlarged side view showing the processing-member detection mechanism of the friction stir welding apparatus according to the present embodiment, showing a state where both the first member and a second member are mounted on the mounting jig. FIG. 6 is a partial enlarged side view showing a state where a probe of a welding tool of the friction stir welding apparatus according to the present embodiment presses the mounting jig. FIG. 7 is a partial enlarged side view showing a probe cleaning mechanism of the friction stir welding apparatus according to the present embodiment.

As shown in FIGS. 1 to 7, a friction stir welding apparatus 1 includes a mounting table 10 fixedly installed on the floor F so that a processing target member W is mounted thereon, a processing-member detection mechanism 20 fixedly installed on the mounting table 10, a welding tool 30 that can be freely arranged opposite to the mounting table 10 above the mounting table 10, a supplementary support mechanism 40 that can be freely arranged so as to abut on a lower surface of the mounting table 10 below the mounting table 10, a robot 50 fixedly installed on the floor F so as to hold the welding tool 30 and the supplementary support mechanism 40 by a fitting jig 52, a probe detection mechanism 60 fixedly installed on the floor F, and a probe cleaning mechanism 80 fixedly installed on the floor F.

Various constituent elements associated with the friction stir welding apparatus 1 are appropriately controlled by receiving a control signal transmitted from a controller C, to operate so as to perform friction stir welding with respect to the processing target member W. The controller C has an computing processing unit and a memory (both not shown) incorporated therein, and a control program for executing friction stir welding, various pieces of data required therefor, and data of a predetermined welding direction are stored in the memory.

As shown in FIG. 2, the processing target member W mounted on the mounting table 10, the processing-member detection mechanism 20 arranged so as to be able to freely advance and retract with respect to the processing target member W, the probe detection mechanism 60 fixedly installed on the floor F, and the probe cleaning mechanism 80 fixedly installed on the floor F are arranged in a movable range L indicating a limited range defined by the movement of an arm 54 of the robot 50 in which a probe 32 and an abutment member 36 of the welding tool 30 can be located.

Specifically, the mounting table 10 includes a mounting jig 12 fixedly installed on a mounting portion 10a thereof so as to be able to freely mount the processing target member W thereon, and a holding member (not shown) arranged on the mounting jig 12 to detachably fix the processing target member W. The mounting jig 12 is a mounting member, and an upper surface thereof is a mounting surface. The processing target member W is typically a plate member made of metal such as an aluminum material in which a first member W1 and a second member W2 are juxtaposed in a vertical direction and respectively have an overlapped portion on each other. Predetermined portions of the overlapped portions of the first member W1 and the second member W2 are welded along a predetermined weld line by the welding tool 30 that is moved along a predetermined welding direction. The position of the processing target member W on the mounting jig 12 is maintained accurately by holding a part of the processing target member W by the holding member. As a drive source that drives the holding member, a motor or an air cylinder can be mentioned. Needless to mention, the holding member can be driven manually. A pressing member 22a of the processing-member detection mechanism 20 can function also as the holding member.

A plurality of processing-member detection mechanisms 20 are typically provided around the mounting jig 12. However, one processing-member detection mechanism 20 is explained for convenience sake of explanation. As shown in FIGS. 4 and 5, the processing-member detection mechanism 20 includes the pressing member 22a that can freely press the respective upper surfaces of the first member W1 and the second member W2 of the processing target member W mounted on the mounting jig 12, a motor 22b fixed to a side of the mounting portion 10a of the mounting table 10 to apply a drive force so that the pressing member 22a can be freely moved between an upper position and a lower position, an abutment member 24 fixedly installed on the pressing member 22a, and a displacement sensor 25 that can freely abut on the abutment member 24. As a drive source that drives the pressing member 22a, an air cylinder can be mentioned other than the motor.

The pressing member 22a is typically a thick plate member made of metal such as an iron material having enough strength and rigidity. The pressing member 22a is pivotally supported by and fitted to a shaft 22c that connects the pressing member 22a and the motor 22b, and is fitted to a support member 22e typically made of metal such as an iron material having enough strength and rigidity. The motor 22b is fixed to a lower surface of a base 22d fixedly installed on the mounting portion 10a of the mounting table 10. The support member 22e includes a turning shaft 22f that pivotally supports the pressing member 22a, and a turning shaft 22g pivotally supported by a base 22d, thereby supporting the pressing member 22a freely movably between the upper position and the lower position. A protection portion 22h including a pair of protection members 22h1 and 22h2 respectively protruding on a side where the abutment member 24 is provided (for example, when the abutment member 24 is provided on a negative direction side of a y-axis of the pressing member 22a, a negative direction side of the y-axis) is provided in the base 22d.

Typically, the displacement sensor 25 is a contact-type displacement detection sensor, and includes a sensor body 26 fixedly installed on the base 22d by a fixing member 26a, a contact member 28a connected to the sensor body 26, and a bellows 28b that covers the contact member 28a except the end thereof, into which the contact member 28a is inserted. The contact member 28a is applied with an urging force urged upward with respect to the sensor body 26 by an urging member such as a coil spring (not shown) and is fitted to the sensor body 26. The displacement sensor 25 detects an amount of displacement of the contact member 28a when the contact member 28a is pushed into the sensor body 26 against the urging force by the abutment member 24 and is moved downward in a state with an upper end of the contact member 28a abutting on a lower end of the abutment member 24, and transmits to the controller C a detection signal that enables detection of upper surface positions of the first member W1 and the second member W2 of the processing target member W when the pressing member 22a is pressing the upper surfaces thereof with a predetermined load. At the time of friction stir welding, the upper surfaces thereof are surfaces on an entry side of the probe 32.

That is, in the processing-member detection mechanism 20, when the first member W1 and the second member W2 of the processing target member W are mounted on the mounting jig 12, or when only the second member W2 of the processing target member W is mounted on the mounting jig 12, the motor 22b is driven to move the shaft 22c in the vertical direction. Accordingly, the pressing member 22a turns around the rotation shafts 22f and 22g defined in the support member 22e, and corresponding thereto, the pressing member 22a moves between the upper position shown in FIG. 1 and the lower position shown in FIGS. 4 and 5, and can freely advance and retract with respect to the first member W1 and the second member W2. When the pressing member 22a is at the lower position shown in FIGS. 4 and 5 to press the upper surface of the first member W1 or the second member W2 with a predetermined load, the lower end of the abutment member 24 abuts on the upper end of the contact member 28a, and the contact member 28a is moved downward while being pushed into the sensor body 26 against the urging force. The displacement sensor 25 detects an amount of displacement thereof, and transmits to the controller C a detection signal that enables detection of the upper surface positions of the first member W1 and the second member W2 of the processing target member W.

To detect the upper surface positions of the first member W1 and the second member W2 of the processing target member W respectively according to the amount of displacement of the contact member 28a by using the displacement sensor 25, for example, the displacement sensor 25 only needs to detect a difference between respective predetermined reference positions of the first member W1 and the second member W2 provided to the displacement sensor 25 and the position to which the contact member 28a is moved, and transmit a detection signal thereof to the controller C. The controller C then calculates the respective upper surface positions corresponding to the difference by referring to data such as a table format or a calculation formula stored in the memory thereof. At this time, the abutment member 24 follows a track that passes through between the pair of protection members 22h1 and 22h2, so as to be protected from unnecessary contact with other members by the protection members 22h1 and 22h2. The pair of protection members 22h1 and 22h2 can be configured such that when the track of the abutment member 24 deviates for any reason, the abutment member 24 abuts on the corresponding member of the protection members 22h1 and 22h2 and is guided therebetween.

The welding tool 30 includes a probe 32 that is typically a columnar member made of metal such as heat-resistant alloy extending vertically, and is freely rotatable around a central axis Z, which is parallel to a z-axis and freely movable in a vertical direction, a holder 34 that has a coefficient of thermal expansion larger than that of the probe 32 and detachably holds the probe 32, an abutment member 36 having a large diameter than that of the probe 32 and held by the holder 34 so as to be freely rotatable relative to the probe 32, and a drive mechanism 38 that causes the probe 32 held by the holder 34 to move vertically and rotate around the central axis Z. The drive mechanism 38 includes a motor, which is a drive force source, and a shaft or the like that connects the motor and the holder 34 (both not shown) incorporated in a casing 38a. The direction of the central axis Z of the probe 32 is a pressing direction for pressing the processing target member W by rotating the probe 32 at the time of friction stir welding. The abutment member 36 is freely rotatable relative to the probe 32, but does not move relatively in the vertical direction (the direction of the central axis Z of the probe 32). Typically, the abutment member 36 includes a bearing member 36a fitted to the probe 32 and freely rotatable around the central axis Z, and a washer 36b fixed to the lower portion of the bearing member 36a to prevent the bearing member 36a from falling out. An upper end of a contact member 74a of a displacement sensor 70 described later in detail can abut on a lower surface of the washer 36b. At the time of friction stir welding using the friction stir welding apparatus 1, an amount of thermal expansion generated in the probe 32 is at a negligible level such that it can be evaluated not to be generated substantially.

The casing 38a also functions as a frame member fixed to the fitting jig 52 while supporting various constituent elements, and has a hollow cuboidal shape as an example of the structure thereof. In such a welding tool 30, when the drive mechanism 38 moves the holder 34 holding the probe 32 and the abutment member 36 downward, a lower part of the probe 32 is press-fitted into the processing target member W, and can freely reach a position at which the probe 32 penetrates the second member W2, passing through the first member W1 in the processing target member W. Particularly, as shown in FIGS. 3 and 6, the lower part of the probe 32 can freely press an upper surface of a block member 68 of the probe detection mechanism 60 described later in detail and the upper surface (the mounting surface) of the mounting jig 12 with a predetermined load respectively. The predetermined load is set to a value smaller than a processing load at the time of performing friction stir welding with respect to the processing target member W by using the probe 32. The mounting jig 12 is made of a metal material having hardness same as or higher than that of the probe 32 of the welding tool 30. The upper surface of the first member W1 of the processing target member W is referred to as "processing target side surface Ws" for convenience sake.

A detector D typically including a rotary encoder is fixedly installed in the casing 38a as a detector that detects an amount of vertical movement of the probe 32 by the drive mechanism 38. The detector D can measure the number of rotations of the shaft or the like that connects the motor and the holder 34, to freely detect the moving distance of the holder 34 in the vertical direction, that is, an amount of vertical movement of the probe 32 held by the holder 34 based on the number of rotations.

Specifically, when the probe 32 held by the holder 34 is moved downward from a predetermined reference position with respect to a side of the block member 68 of the probe detection mechanism 60 by the drive mechanism 38 to press the upper surface of the block member 68 with a predetermined load by the lower end of the probe 32, the detector D can freely detect a length of the member including the holder 34 and the probe 32, typically, a length obtained by adding a length between an upper end and a lower end of the holder 34 and a length of the probe 32 from the lower end of the holder 34 to the lower end of the probe 32, based on the amount of movement of the probe 32 and the holder 34 holding the probe 32 that have moved down from the predetermined reference position. When having detected the length of the member including the holder 34 and the probe 32, the detector D transmits a detection signal thereof to the controller C. A thermally expanded length of mainly the holder 34 due to heat generated at the time of friction stir welding and a worn-part length of the probe 32 at the time of friction stir welding are reflected in the length of the member including the holder 34 and the probe 32. The length of the member becomes long by the thermally expanded length of the holder 34, and becomes short by the worn-part length of the probe 32. The lower end of the probe 32, that is, a surface at the tip end of the probe 32 is not limited to a flat surface, and can be a curved surface or a surface having irregularities, so long as the apical surface can press the block member 68 in a steady state.

When the probe 32 held by the holder 34 is moved downward from the predetermined reference position by the drive mechanism 38 with respect to the upper surface of the mounting jig 12 to press the upper surface thereof by the lower end of the probe 32 with the predetermined load, the detector D detects the amount of movement of the probe 32 and the holder 34 holding the probe 32 that have moved down from the predetermined reference position, and transmits to the controller C a detection signal that enables detection of the upper surface position of the mounting jig 12. To detect the upper surface position of the mounting jig 12 by using the detector D based on the amount of movement of the probe 32 and the holder 34 holding the probe 32, the controller C only needs to calculate the upper surface position of the mounting jig 12 corresponding to the amount of movement by referring to data such as the table format or the calculation formula stored in the memory thereof beforehand. The upper surface position of the mounting jig 12 can be calculated in the same manner by the detector D itself by using the amount of movement.

The supplementary support mechanism 40 includes a supplementary support member 42, which is typically a ball member made of metal such as an iron material, and abuts on a lower surface of the mounting portion 10a on an opposite side to the mounting jig 12, and a holder 44 that holds the supplementary support member 42 rotatably, while maintaining the central position thereof immovable. In the supplementary support mechanism 40, the supplementary support member 42 can freely support the mounting table 10 supplementarily, while abutting on the lower surface of the mounting portion 10a of the mounting table 10 at one point in the upper portion of the supplementary support member 42, in a state with the supplementary support member 42 facing the lower end of the probe 32, putting the processing target member W therebetween.

The robot 50 is a movement mechanism that can freely move the welding tool 30 and the processing target member W fixed on the mounting jig 12 of the mounting table 10 relative to each other, and typically, is an industrial robot. Specifically, the robot 50 includes a fitting jig 52 made of metal in a two-pronged shape as viewed from the side, which is typically a chopped steel product and has an upper fitting portion 52a and a lower fitting portion 52b, respectively, fitted with the welding tool 30 and the supplementary support mechanism 40 correspondingly, an arm 54 fitted with the fitting jig 52, which is typically a manipulator having multiple joints, and a robot body 56 having a drive mechanism that moves the arm 54, an computing processing unit, and a memory incorporated therein (all not shown).

While the casing 38a of the drive mechanism 38 of the welding tool 30 is fitted and fixed to the upper fitting portion 52a of the fitting jig 52, the holder 44 of the supplementary support mechanism 40 is fitted and fixed to the lower fitting portion 52b of the fitting jig 52. A connected portion between the upper fitting portion 52a and the lower fitting portion 52b of the fitting jig 52 is fixed and fitted to a support portion 54a at one end of the arm 54 by fastening or the like, and the robot body 56 is connected to the other end of the arm 54. By operating the drive mechanism of the robot body 56, the arm 54 moves, and corresponding thereto, the welding tool 30 and the supplementary support mechanism 40 can be freely moved with multiple degrees of freedom to the left, right, up, and down, while maintaining the relative positional relation between the welding tool 30 and the supplementary support mechanism 40.

Particularly as shown in FIG. 3, the probe detection mechanism 60 includes a base 62 fixedly installed on the floor F, a support pillar 64 provided in a standing condition to the base 62, a support 66 fixedly installed on the support pillar 64, the block member 68 fixedly installed to the support 66, and typically one displacement sensor 70 fitted to the block member 68. The base 62, the support pillar 64, the support 66, and the block member 68 respectively have enough strength and rigidity.

A corbel member 68a made of a metal material having hardness same as or higher than that of the probe 32 of the welding tool 30 is fixedly installed on the upper surface of the block member 68. The lower end of the probe 32 can abut on and freely press the corbel member 68a, and the supplementary support member 42 of the supplementary support mechanism 40 can abut on and freely press the lower surface of the block member 68.

Typically, the displacement sensor 70 is a contact-type displacement detection sensor like the displacement sensor 25, and includes a sensor body 72 fixedly installed to the block member 68 by a fixing member 72a, a contact member 74a connected to the sensor body 72, and a bellows 74b that covers the contact member 74a except the end thereof, into which the contact member 74a is inserted. The contact member 74a is applied with an urging force urged upward with respect to the sensor body 72 by an urging member such as a coil spring (not shown) and is fitted to the sensor body 72. The displacement sensors 70 can freely detect a tip length of the probe 32 when the lower end of the probe 32 abuts on the upper surface of the corbel member 68a to press the corbel member 68a with the predetermined load and the supplementary support member 42 abuts on the lower surface of the block member 68 to press the block member 68 with the predetermined load, according to the position of the contact member 74a when the contact member 74a is pushed into the sensor body 72 against the urging force by the abutment member 36 and is moved downward, in a state with an upper end of the contact member 74a abutting on a lower surface of the abutment member 36, which is typically the lower surface of the washer 36b. The predetermined load when the supplementary support member 42 abuts on the lower surface of the block member 68 and presses the block member 68 is a reaction force of the predetermined load when the lower end of the probe 32 presses the upper surface of the corbel member 68a, and the predetermined load is set to a value smaller than the processing load at the time of performing friction stir welding with respect to the processing target member W by using the probe 32.

As shown in FIG. 3, in the probe detection mechanism 60, when the lower end of the probe 32 abuts on and press the upper surface of the corbel member 68a with the predetermined load and the supplementary support member 42 abuts on and press the lower surface of the block member 68 with the predetermined load, the lower surface of the abutment member 36 abuts on the upper end of the contact member 74a, and the contact member 74a is pushed into the sensor body 72 against the urging force and is moved downward. Accordingly, the displacement sensors 70 can freely detect a length from a predetermined reference surface of the probe 32, that is, from the lower surface of the abutment member 36 to the lower surface presenting a tip position of the probe 32, that is, the tip length of the probe 32 according to the moved distance of the contact member 74a. The reference surface of the probe 32 can be replaced by a reference portion having other shapes such as a convex or concave portion, so long as the upper end of the contact member 74a can abut on the reference surface. As described above, the apical surface at the end of the probe 32 is not limited to the flat surface, and can be a curved surface or a surface having irregularities. However, the tip length of the probe 32 is a length from the lower surface of the abutment member 36 to a distal end of the curved surface or the irregularities.

When having detected the tip length of the probe 32, the detector D transmits a detection signal to the controller C. Because the probe 32 does not thermally expand substantially due to heat generated at the time of friction stir welding, only a wear volume of the probe 32 worn off at the time of friction stir welding with respect to a new probe 32 can be reflected in the tip length of the probe 32, and the tip length of the probe 32 becomes short by a worn-part length of the probe 32. That is, when the wear volume of the probe 32 exceeds a predetermined limit, the probe 32 needs to be replaced by a new probe 32.

Specifically, in the case of a new probe 32 to be used for the first time, because the probe 32 is not worn off, the tip length of the probe 32 reflects a dimension error of the probe 32. When the probe 32 is an already used product, the probe 32 is worn off, and thus the tip length reflects the wear volume of the probe 32 in addition to the dimension error of the new probe 32. The wear volume of the probe 32 can be obtained by subtracting the tip length of the already used probe 32 from the tip length of a new probe 32 by the controller C. The controller C can use the tip length of the new probe 32 and the tip length of the already used probe 32 that are respectively detected by the detector D and stored in the memory. When the controller C determines that the wear volume has exceeded the predetermined limit, it is desired that the controller C alerts an operator by lighting a display unit (not shown) or the like.

Particularly as shown in FIG. 7, the probe cleaning mechanism 80 includes a support pillar 84 provided in a standing condition on the base 62, a support 86 fixedly installed to the support pillar 84, and a roughing unit 88a and a final polishing unit 88b fixedly installed on the support 86. The support pillar 84 and the support 86 respectively have enough strength and rigidity. In a state with the probe 32 of the welding tool 30 being rotated, at the time of accommodating the lower part of the probe 32 in the roughing unit 88a, the roughing unit 88a can scrape off processing chips adhered to the lower part of the probe 32 by a cutting blade fixed in the roughing unit 88a. Furthermore, when the lower part of the probe 32 abuts on the final polishing unit 88b in the state with the probe 32 of the welding tool 30 being rotated, the final polishing unit 88b can polish the lower part of the probe 32 having been roughed so that the probe 32 can be applied to friction stir welding, by a finishing brush member fixed on the entire surface of the final polishing unit 88b.

Particularly as shown in FIG. 7, the probe cleaning mechanism 80 commonly uses the base 62 of the probe detection mechanism 60, and is provided adjacent to the probe detection mechanism 60. Therefore, after cleaning the used probe 32, the tip length of the probe 32 can be immediately detected by fitting the cleaned probe 32 to the holder 34, and the length of the member including the holder 34 and the probe 32 can be detected.

In this case, after the controller C moves the arm 54 via the robot body 56 of the robot 50 and positions the welding tool 30 at an upper position of the processing target member W mounted on the mounting jig 12, the controller C moves the welding tool 30 downward to the processing target member W to press-fit the probe 32 into the processing target member W and rotate the probe 32, and stirs the processing target member W by the probe 32 while generating friction heat in the processing target member W. The controller C executes control to perform friction stir welding with respect to the processing target member W along a predetermined weld line by moving the probe 32 and the processing target member W relative to each other by the arm 54 of the robot 50. The controller C respectively executes control to detect the tip length of the probe 32 by the probe detection mechanism 60, control to detect the length of the member including the holder 34 and the probe 32 by causing the probe 32 to press the upper surface of the block member 68 of the probe detection mechanism 60, control to detect the upper surface position of the mounting jig 12 by causing the probe 32 to press the upper surface thereof, control to detect the respective upper surface positions of the first member W1 and the second member W2 of the processing target member W by the processing-member detection mechanism 20, and control to clean the probe 32 by the probe cleaning mechanism 80.

Next, various operations to be performed by the friction stir welding apparatus 1 at the time of executing friction stir welding with respect to the processing target member W by using the friction stir welding apparatus 1 having the configuration described above are explained below in detail.

First, before starting a series of processes of friction stir welding, as preparation therefor, under control of the controller C, the drive mechanism of the robot body 56 appropriately moves the arm 54 vertically and horizontally, to arrange the probe 32 of the welding tool 30 fitted to the upper fitting portion 52a of the fitting jig 52 so as to face the corbel member 68a fixedly installed on the upper surface of the block member 68 of the probe detection mechanism 60 above the corbel member 68a. At this time, the supplementary support member 42 of the supplementary support mechanism 40 fitted to the lower fitting portion 52b of the fitting jig 52 is arranged to abut on the lower surface of the block member 68, putting the block member 68 therebetween.

When respective positions of the probe 32 and the supplementary support member 42 are realized in this manner, under control of the controller C, as shown in FIG. 3, the drive mechanism 38 of the welding tool 30 moves the holder 34 holding the probe 32 downward to move the probe 32 downward, so that the lower end of the probe 32 abuts on the upper surface of the corbel member 68a to press the corbel member 68a with the predetermined load. At this time, one point in the upper portion of the supplementary support member 42 abuts on the lower surface of the block member 68 to press the block member 68 with the predetermined load.

At this time, the lower surface of the abutment member 36, that is, the lower surface of the washer 36b abuts on the upper end of the contact member 74a, and the contact member 74a of the displacement sensor 70 is being moved downward while being pushed into the sensor body 72 against the urging force. The displacement sensor 70 detects the length from the reference surface in the probe 32, that is, from the lower surface of the abutment member 36 to the lower surface (the apical surface) of the lower end (the tip) of the probe 32, that is, the tip length of the probe 32 according to the moved distance of the contact member 74a, which is the amount of displacement of the contact member 74a, and transmits the detection signal to the controller C. The tip length of the probe 32 reflects a dimension error of the probe 32 when the probe 32 is new, and the tip length reflects the wear volume of the probe 32 in addition to the dimension error in the new probe 32 when the probe 32 is an already used product. In each case, the controller C stores the detection value in the memory. The controller C reads the detection value and performs computation of subtracting the tip length when the probe 32 is a used product from the tip length of a new probe 32 to calculate the wear volume of the probe 32. When determining that the wear volume has exceeded the predetermined limit, the controller C lights the display unit. When the controller C lights the display unit, an operator replaces the probe 32 by a new one. However, when the probe 32 to be used for friction stir welding this time is new, the calculation process of the wear volume of the probe 32 is not performed as it is not required.

Simultaneously, at this time, the detector D detects the length of the member including the holder 34 and the probe 32, typically, a length obtained by adding the length from the lower end of the holder 34 to at least a part of the upper part of the holder 34 and the length of the probe 32 from the lower end of the holder 34 to the lower end of the probe 32, based on the amount of movement of the probe 32 and the holder 34 holding the probe 32 that have moved down from the predetermined reference position, and transmits a detection signal to the controller C. In the length of the member including the holder 34 and the probe 32, the thermally expanded length of mainly the holder 34 due to heat generated at the time of friction stir welding and the worn-part length of the probe 32 at the time of friction stir welding can be reflected. The length of the member becomes long by the thermally expanded length of the holder 34, and becomes short by the worn-part length of the probe 32. The controller C stores the detection value in the memory in each case.

That is, when there is a time gap between the current friction stir welding and the last friction stir welding and the temperature of the probe 32 and the holder 34 decreases to a normal temperature, the length of the member including the holder 34 and the probe 32 becomes the reference length only including the dimension error when the probe 32 is new, and becomes a length including the wear volume of the probe 32 in addition to the dimension error when the probe 32 is a used product. Accordingly, in such cases, when the probe 32 is a used product, because the position of the lower end (the tip) of the probe 32 held by the holder 34 is deviated upward from the reference position of the new probe by the wear volume, the position of the lower end of the probe 32 held by the holder 34 needs to be corrected so as to be positioned downward by the wear volume so that the lower end of the probe 32 is positioned at the reference position. Accordingly, the controller C reads the detection value to calculate a correction amount to correct the position of the lower end of the probe 32 so that the lower end of the probe 32 is positioned downward by the wear volume and is positioned at the reference position. However, when the probe 32 to be used for the current friction stir welding is new, the calculation process of the correction amount of the position of the lower end of the probe 32 is not performed as it is not required.

On the other hand, when there is no time gap between the current friction stir welding and the last friction stir welding and the temperature of the probe 32 and the holder 34 is high, the length of the member including the holder 34 and the probe 32 becomes a reference length including the amount of thermal expansion of the holder 34 and the like except the probe 32 in addition to the dimension error of the probe 32 when the probe 32 is new. When the probe 32 is a used product, the length of the member becomes a length including the amount of thermal expansion of the holder 34 and the like except the probe 32 and the wear volume of the probe 32 in addition to the dimension error thereof. Accordingly, in each case, when the probe 32 is a used product, the position of the lower end (the tip) of the probe 32 held by the holder 34 is deviated from an initial position of the new probe by the wear volume of the probe 32 and the amount of thermal expansion of the holder 34 and the like except the probe 32. Therefore, the position of the lower end of the probe 32 held by the holder 34 needs to be corrected to balance out the amount of deviation thereof and positioned at the reference position. Accordingly, the controller C reads the detection value to calculate a correction amount for balancing out the deviated amount and positioning the lower end of the probe 32 at the reference position. However, even if the probe 32 to be used for the current friction stir welding is new, when there is no time gap between the current friction stir welding and the last friction stir welding and the temperature of the probe 32 and the holder 34 is high, the calculation process of the correction amount of the position of the lower end of the probe 32 is required and thus the calculation process is performed.

Next, under control of the controller C, the drive mechanism of the robot body 56 appropriately moves the arm 54 vertically and horizontally, to arrange the probe 32 of the welding tool 30 fitted to the upper fitting portion 52a of the fitting jig 52 so as to face the mounting jig 12 at the predetermined position above the mounting jig 12. At this time, the supplementary support member 42 of the supplementary support mechanism 40 fitted to the lower fitting portion 52b of the fitting jig 52 is arranged to abut on the lower surface of the mounting portion 10a, putting the mounting portion 10a of the mounting table 10 and the mounting jig 12 fitted to the mounting portion 10a between the probe 32 and the supplementary support member 42.

When respective positions of the probe 32 and the supplementary support member 42 are realized in this manner, under control of the controller C, as shown in FIG. 6, the drive mechanism 38 of the welding tool 30 moves the holder 34 holding the probe 32 downward to move the probe 32 downward, so that the lower end of the probe 32 abuts on the upper surface of the mounting jig 12 and presses the mounting jig 12 with the predetermined load. At this time, one point in the upper portion of the supplementary support member 42 abuts on the lower surface of the mounting portion 10a and presses the lower surface of the mounting portion 10a with the predetermined load.

When the lower end of the probe 32 presses the upper surface of the mounting jig 12 with the predetermined load, because the drive mechanism 38 is moving the holder 34 downward, the probe 32 is also being moved downward, and the detector D detects the amount of movement of the probe 32 and the holder 34 holding the probe 32 that have moved down from the predetermined reference position, and transmits the detection signal to the controller C. The controller C calculates the upper surface position of the mounting jig 12 corresponding to the amount of movement indicated by the detection signal by referring to the data stored in the memory beforehand. The upper surface position of the mounting jig 12 reflects a dimension error and an installation error of the mounting jig 12 when the mounting jig 12 is new and newly used, or also reflects the level of adherence of the paint of the processing target member W when the mounting jig 12 is a used product. Therefore, when the error of the upper surface position of the mounting jig 12 or adherence of the paint thereto is larger than a reference, the controller C newly calculates a correction amount of the position of the lower end of the probe 32 by adding the upper surface position of the mounting jig 12 to the correction amount of the position of the lower end of the probe 32.

Next, after only the second member W2 of the processing target member W is mounted on the mounting jig 12, under control of the controller C, as shown in FIG. 4, the motor 22b of the processing-member detection mechanism 20 is driven to move the pressing member 22a downward while causing the pressing member 22a to enter into an area above the second member W2, and the lower surface of the pressing member 22a is made to abut on the upper surface of the second member W2 and press the second member W2 with the predetermined load.

At this time, the lower end of the abutment member 24 abuts on the upper end of the contact member 28a, and the contact member 28a is being moved downward while being pushed into the sensor body 26 against the urging force. Accordingly, the moved distance of the contact member 28a, specifically, the amount of displacement of the contact member 28a, which is a difference between a predetermined reference position of the upper surface position of the second member W2 and the position to which the contact member 28a has been moved, is detected and a detection signal thereof is transmitted to the controller C. The controller C calculates the upper position of the second member W2 corresponding to the amount of displacement of the contact member 28a indicated by the detection signal by referring to the data such as the table format or the calculation formula stored in the memory beforehand. Because the upper surface position of the second member W2 reflects the plate thickness and the installation error of the second member W2, when the error of the upper surface position of the second member W2 is larger than a reference, the controller C newly calculates the correction amount of the position of the lower end of the probe 32 by adding the upper surface position of the second member W2 to the correction amount of the position of the lower end of the probe 32.

Next, under control of the controller C, the motor 22b is driven to move the pressing member 22a upward to exit from the area above the second member W2. After the first member W1 is mounted on the second member W2 of the processing target member W mounted on the mounting jig 12 of the mounting table 10, under control of the controller C, as shown in FIG. 5, the motor 22b is driven to move the pressing member 22a downward while causing the pressing member 22a to enter into the area above the first member W1, and the lower surface of the pressing member 22a is made to abut on the upper surface of the first member W1 and press the first member W1 with the predetermined load.

At this time, the lower end of the abutment member 24 abuts on the upper end of the contact member 28a, and the contact member 28a is being moved downward while being pushed into the sensor body 26 against the urging force. Accordingly, the moved distance of the contact member 28a, specifically, the amount of displacement of the contact member 28a, which is a difference between a predetermined reference position of the upper surface position of the first member W1 and the position to which the contact member 28a has been moved, is detected and a detection signal thereof is transmitted to the controller C. The controller C calculates the upper position of the first member W1 corresponding to the amount of displacement of the contact member 28a indicated by the detection signal by referring to the data such as the table format or the calculation formula stored in the memory beforehand. Because the upper surface position of the first member W1 reflects the plate thickness and the installation error of the first member W1 in addition to those of the second member W2, when the error of the upper surface position of the first member W1 is larger than a reference, the controller C newly calculates the correction amount of the position of the lower end of the probe 32 by adding the upper surface position of the first member W1 to the correction amount of the position of the lower end of the probe 32.

Next, under control of the controller C, as shown in FIG. 1, the drive mechanism of the robot body 56 appropriately moves the arm 54 vertically and horizontally, to arrange the probe 32 of the welding tool 30 fitted to the upper fitting portion 52a of the fitting jig 52 so as to face the processing target member W at a predetermined position above the processing target member W, and cause the supplementary support member 42 of the supplementary support mechanism 40 fitted to the lower fitting portion 52b of the fitting jig 52 to abut on the lower surface of the mounting portion 10a of the mounting table 10 at one point in the upper part of the supplementary support member 42 so as to face the lower part of the probe 32, putting the processing target member W therebetween. At this time, the position of the processing target member W is accurately maintained by holding a part of the processing target member W by the holding member.

Next, when respective positions of the probe 32 and the supplementary support member 42 are realized in this manner, under control of the controller C, the drive mechanism 38 of the welding tool 30 moves the holder 34 holding the probe 32 downward to move the probe 32 downward, so that the lower part of the probe 32 reaches a predetermined position at which the lower part of the probe 32 passes through the first member W1 of the processing target member W and penetrates the second member W2. At this time, a penetration depth of the probe 32 passing through the first member W1 and penetrating the second member W2 is set by the controller C by correcting a standard penetration depth set beforehand by increasing/decreasing the penetration depth by the correction amount calculated, taking into consideration the tip length of the probe 32, the upper surface position of the mounting jig 12, the upper surface position of the second member W2, and the upper surface position of the first member W1 detected in the processes described above, and is maintained substantially constant at the time of executing friction stir welding. At this time, the drive mechanism 38 of the welding tool 30 can rotate the probe 32 via the holder 34 according to need.

Next, when the lower part of the probe 32 has reached the predetermined position in this manner, in a state where the drive mechanism 38 of the welding tool 30 is continuously rotating the probe 32 under control of the controller C, the drive mechanism of the robot body 56 moves the arm 54 so that the probe 32 and the supplementary support member 42 are moved in a moving direction, which is the predetermined welding direction, in a state with their positional correspondence relation with respect to the processing target members W being maintained. As a result, the first member W1 and the second member W2 are friction stir welded corresponding to a moved track of the lower part of the probe 32. Simultaneously, the supplementary support member 42 is being moved in the predetermined welding direction while rotating in the holder 44, in the state where the supplementary support member 42 abuts on the lower surface of the mounting portion 10a of the mounting table 10 at one point in the upper part of the supplementary support member 42, so as to face the lower part of the probe 32, putting the processing target member W therebetween.

Next, when the probe 32 has been moved in this manner to a predetermined position, which is an end point of a portion required to be friction stir welded, with the movement of the arm 54, the drive mechanism 38 of the welding tool 30 moves the probe 32 upward, while maintaining the rotation of the probe 32, to pull out the probe 32 from the processing target member W under control of the controller C, and after having uplifted the probe 32 to the upper position thereof, stops the movement of the probe 32. The drive mechanism of the robot body 56 then moves the arm 54 so that the probe 32 and the supplementary support member 42 exit from the areas above and below the processing target member W, and stops the movement of the arm 54.

Next, when the probe 32 and the supplementary support member 42 have exited in this manner, under control of the controller C, the motor 22b is driven to move the pressing member 22a upward so that the pressing member 22a exits from the area above the first member W of the processing target member W, and then stops the movement of the pressing member 22a.

Next, when the processing target member W is released by detaching the holding member and is dismounted from the mounting table 10, a processed product in which a predetermined portion is friction stir welded can be obtained.

Thereafter, when a next series of processes of friction stir welding is to be started without replacing the probe 32, before the tip length of the probe 32 is detected by using the probe detection mechanism 60, the probe 32 is cleaned. When the probe 32 is replaced every time friction stir welding is performed, such a process is not required.

Specifically, under control of the controller C, the drive mechanism of the robot body 56 appropriately moves the arm 54 vertically and horizontally, to arrange the probe 32 of the welding tool 30 fitted to the upper fitting portion 52a of the fitting jig 52 so as to face the roughing unit 88a of the probe cleaning mechanism 80 above the roughing unit 88a. At this time, the supplementary support member 42 of the supplementary support mechanism 40 fitted to the lower fitting portion 52b of the fitting jig 52 does not need to abut on the lower surface of the support 86.

When respective positions of the probe 32 and the supplementary support member 42 are realized in this manner, under control of the controller C, as shown in FIG. 7, the drive mechanism 38 of the welding tool 30 moves the holder 34 holding the probe 32 downward to move the probe 32 downward while rotating the probe 32, so that the lower part of the probe 32 is accommodated in the roughing unit 88a and roughed for a predetermined time.

Next, when the predetermined time has passed, under control of the controller C, the drive mechanism 38 of the welding tool 30 moves the holder 34 holding the probe 32 upward to pull the probe 32 out from the roughing unit 88a, and the drive mechanism of the robot body 56 appropriately moves the arm 54 vertically and horizontally, to arrange the probe 32 of the welding tool 30 fitted to the upper fitting portion 52a of the fitting jig 52 so as to face the final polishing unit 88b of the probe cleaning mechanism 80 above the final polishing unit 88b. At this time, the supplementary support member 42 of the supplementary support mechanism 40 fitted to the lower fitting portion 52b of the fitting jig 52 does not need to abut on the lower surface of the support 86.

When respective positions of the probe 32 and the supplementary support member 42 are realized in this manner, under control of the controller C, the drive mechanism 38 of the welding tool 30 moves the holder 34 holding the probe 32 downward to move the probe 32 downward while rotating the probe 32, so that the lower part of the probe 32 is accommodated in the final polishing unit 88b and is subjected to final polishing for a predetermined time.

Thereafter, when the predetermined time has passed, the tip length of the probe 32 is sequentially detected by using the probe detection mechanism 60, and the length of the member including the holder 34 and the probe 32 is detected by causing the probe 32 to press the upper surface side of the block member 68 of the probe detection mechanism 60. The upper surface position of the mounting jig 12 is detected by causing the probe 32 to press the upper surface thereof, and after the respective upper surface positions of the first member W1 and the second member W2 of the processing target member W are detected by using the processing-member detection mechanism 20, friction stir welding can be executed.

According to the configuration of the present embodiment described above, when adherence or the like of the paint to the mounting jig 12 can be ignored, the frequency of the process of detecting the upper surface position of the mounting jig 12 by causing the probe 32 to press the upper surface thereof can be reduced, or the process can be omitted for simplifying the process.

In the configuration of the present embodiment described above, a configuration example of applying the supplementary support mechanism 40 has been explained. However, the supplementary support mechanism 40 can be omitted when required processing accuracy is relatively low.

In the configuration of the present embodiment described above, it has been explained that the supplementary support member 42 of the supplementary support mechanism 40 is a ball member. However, other movable members such as a rotatable member can be applied, or a fixed member can be used when friction or the like hardly occurs.

According to the configuration of the present embodiment, as the drive mechanism 38 moves downward the holder 34 having a coefficient of thermal expansion larger than that of the probe 32 and holding the probe 32, the detector D can freely detect the length of the member including the holder 34 and the probe 32, and the probe detection mechanism 60 can freely detect the tip length, which is the length of the member of only the probe 32. Accordingly, because the length of the member including the holder 34 and the probe 32 reflects thermal expansion of the holder 34 and wear of the probe 32, an insertion amount of the probe 32 into the processing target member W at the time of friction stir welding to be performed by using the friction stir welding apparatus 1 can be corrected in an appropriate manner. Furthermore, because the tip length of the probe 32 reflects only the wear of the probe 32, when the wear volume of the probe 32 exceeds the upper limit, the probe can be appropriately replaced by a new probe. Consequently, the penetrating position of the probe with respect to the processing target member W can be controlled to the optimum position at the time of friction stir welding, by detecting the wear volume and the tip position of the probe 32, in the optimum mode for executing friction stir welding.

According to the configuration of the present embodiment, the probe detection mechanism 60 has the block member 68 whose position is fixed and the displacement sensor 70 fixed to the side of the block member 68, and at the time of detecting the tip length of the probe 32, after the movement mechanism 50 moves the arm 54 so that the welding tool 30 faces the block member 68, the drive mechanism 38 moves down the holder 34 holding the probe 32 to press the upper surface side of the block member 68 by the tip of the probe 32, and the contact member 74a of the displacement sensor 70 comes in contact with the abutment member 36 of the welding tool 30 and is moved, thereby detecting displacement of the contact member 74a. Consequently, the wear volume and the tip position of the probe 32 can be reliably detected, while reliably fixing the position of the probe 32 at the time of executing detection with a simple configuration.

According to the configuration of the present embodiment, further, the detector D can freely detect the amount of vertical movement of the holder 34 and the probe 32 held by the holder 34 by the drive mechanism 38, and detects the length of the member including the holder 34 and the probe 32 based on the amount of movement after the movement mechanism 50 moves the arm 54 so that the welding tool 30 faces the block member 68 until the holder 34 holding the probe 32 is moved down by the drive mechanism 38 to press the upper surface side of the block member 68 by the tip of the probe 32. Consequently, the tip position of the probe 32 can be reliably detected with a simple configuration.

Furthermore, according to the configuration of the present embodiment, the supplementary support mechanism 40 that supports the mounting member 12 by the support member 42 to supplementarily support only the vertical position of the processing target member W is provided. The supplementary support mechanism 40 is fitted to the arm 54, and at the time of detecting the length of the member including the holder 34 and the probe 32 and the tip length of the probe 32, the welding tool 30 is moved down so that the tip of the probe 32 presses the upper surface side of the block member 68, and the support member 42 supports the lower surface side of the block member 68. Accordingly, at the time of executing friction stir welding, the probe 32 and the processing target member W can be positioned more accurately, thereby enabling to perform friction stir welding while reliably controlling the distance between the probe 32 and the processing target member W to the predetermined distance. Furthermore, the wear volume and the tip position of the probe 32 can be detected more reliably, while fixing the position of the probe 32 at the time of executing the detection more reliably.

Further, according to the configuration of the present embodiment, the probe cleaning mechanism 80 that cleans the probe 32 is further provided. The probe cleaning mechanism 80 has the roughing unit 88a and the final polishing unit 88b, and at the time of cleaning the probe 32, after the movement mechanism 50 moves the arm 54 so that the welding tool 30 faces the roughing unit 88a, the welding tool 30 is moved down to accommodate the tip of the probe 32 in the roughing unit 88a, and the welding tool 30 is rotated to rough the tip. Thereafter, after the movement mechanism 50 moves the arm 54 so that the welding tool 30 faces the final polishing unit 88b, the welding tool 30 is moved down to accommodate the tip of the probe 32 in the final polishing unit 88b, and the welding tool 30 is rotated to polish the tip. Consequently, the probe 32 can be cleaned reliably by using rotation of the probe 32 with a simple configuration.

According to the configuration of the present embodiment, the detector D can freely detect the amount of vertical movement of the holder 34 and the probe 32 held by the holder 34 by the drive mechanism 38, and detects the amount of movement after the movement mechanism 50 moves the arm 54 so that the welding tool 30 faces the mounting surface of the mounting member 12 until the welding tool 30 is moved down to press the mounting surface of the mounting member 12 by the tip of the probe 32. Consequently, the surface position of the mounting surface of the mounting member 12 can be reliably detected with a simple configuration, without providing any additional sensor for detecting the mounting surface of the mounting member 12.

Furthermore, according to the configuration of the present embodiment, the supplementary support mechanism 40 that supports the mounting member 12 by the support member 42 to supplementarily support only the vertical position of the processing target member W is provided. At the time of detecting the amount of movement after the movement mechanism 50 moves the arm 54 so that the welding tool 30 faces the mounting surface of the mounting member 12 until the welding tool 30 is moved down to press the mounting surface of the mounting member 12 by the tip of the probe 32, the welding tool 30 is moved down to press the mounting surface of the mounting member 12 by the tip of the probe 32 and the support member 42 supports the opposite side to the mounting surface of the mounting member 12. Consequently, at the time of executing friction stir welding, the probe 32 and the processing target member W can be positioned more accurately, thereby enabling to perform friction stir welding while reliably controlling the distance between the probe 32 and the processing target member W to the predetermined distance. Furthermore, the surface position of the mounting surface of the mounting member 12 can be detected more reliably with a simple configuration, without providing any additional sensor for detecting the mounting surface of the mounting member 12.

Further, according to the configuration of the present embodiment, the pressing member 22a that can freely press the processing target member W mounted on the mounting member 12, and the processing-member detection mechanism 20 having the displacement sensor 25 fixed to the side of the mounting member 12 are provided. When the pressing member 22a presses the upper surface of the processing target member W, the contact member 28a of the displacement sensor 25 comes in contact with the side of the pressing member 22a and is moved, thereby detecting the amount of displacement of the contact member 28a. Consequently, the surface position of the processing target member W in the state of being mounted on the mounting member 12 can be further detected, and thus the penetrating position of the probe 32 with respect to the processing target member W can be controlled reliably to the optimum position at the time of friction stir welding.

According to the configuration of the present embodiment, the processing target member W has the lower member W2 and the upper member W1, and when the pressing member 22a presses the upper surface of the lower member W2 mounted on the mounting member 12, the contact member 28a of the displacement sensor 25 comes in contact with the side of the pressing member 22a and is moved, thereby detecting the amount of displacement of the contact member 28a, or when the pressing member 22a presses the upper surface of the upper member W1 mounted on the lower member W2, the contact member 28a of the displacement sensor 25 comes in contact with the side of the pressing member 22a and is moved, thereby detecting the amount of displacement of the contact member 28a. Consequently, the upper surface position of each of the constituent members W1 and W2 of the processing target member W in the state of being mounted on the mounting member 12 can be respectively detected, and the penetrating position of the probe 32 with respect to the processing target member W can be controlled more reliably to the optimum position at the time of friction stir welding.

According to the configuration of the present embodiment, the probe detection mechanism 60, the processing-member detection mechanism 20, the probe cleaning mechanism 80, and the processing target member W mounted on the mounting member 12 are arranged within the movable range of the welding tool 30 defined by the movement of the arm 54 by the movement mechanism 50. Consequently, the overall configuration of the friction stir welding apparatus 1 can be maintained compact, and further, the wear volume and the tip position of the probe 32, the surface position of the mounting surface of the mounting member 12, and the surface position of the processing target member W in the state of being mounted on the mounting member 12 can be detected, while necessarily cleaning the probe 32, in the mode with high positional consistency between the constituent elements.

According to the configuration of the present embodiment, the movement mechanism 50 is an industrial robot. Accordingly, the probe 32 can be moved accurately with respect to the probe detection mechanism 60, the probe cleaning mechanism 80, and the processing target member W mounted on the mounting member 12 with a more general purpose configuration.

In the present invention, the shape, the arrangement, the number, and the like of the members are not limited to those in the embodiments explained above, and it is needless to mention that the constituent elements can be modified as appropriate without departing from the scope of the invention, such as appropriately replacing these elements by other ones having identical operational effects.

As described above, the present invention can provide a friction stir welding apparatus that can control the penetrating position of the probe with respect to the processing target member to an optimum position at the time of friction stir welding, by detecting a wear volume and a tip position of the probe, in the optimum mode for executing friction stir welding. Therefore, because of its general purposes and universal characteristics, applications of the present invention can be expected in a wide range in the field of friction stir welding of a strength member of a movable body such as an automobile.

What is claimed is:

1. A friction stir welding apparatus comprising:
   a mounting member on which a processing target member is mounted;
   a welding tool having a probe, a holder having a coefficient of thermal expansion larger than that of the probe and holding the probe detachably, a drive mechanism that can drive the holder holding the probe to freely move the probe vertically with respect to a processing target side surface of the processing target member and can freely rotate with respect to the processing target member, and a detector that can freely detect a length of a member including the holder and the probe as the drive mechanism moves the holder holding the probe downward;
   a movement mechanism having an arm to which a fitting jig fitted with the welding tool is fixed so as to be able to freely move the welding tool with respect to the processing target member by moving the arm; and
   a probe detection mechanism that can freely detect a tip length, which is a length of a member of only the probe, as the drive mechanism moves the holder holding the probe downward,
   wherein the probe detection mechanism has a block member whose position is fixed and a displacement sensor fixed to the block member side, and at a time of detecting the tip length of the probe, after the movement mechanism moves the arm so that the welding tool faces the block member, the drive mechanism moves down the holder holding the probe to press an upper surface side of the block member by a tip of the probe, and a contact member of the displacement sensor comes in contact with an abutment member of the welding tool and is moved, thereby detecting displacement of the contact member.

2. The friction stir welding apparatus according to claim 1, wherein the detector can freely detect an amount of vertical movement of the holder and the probe held by the holder by the drive mechanism, and detects the length of the member including the holder and the probe based on the amount of movement after the movement mechanism moves the arm so that the welding tool faces the block member until the holder holding the probe is moved down by the drive mechanism to press the upper surface side of the block member by the tip of the probe.

3. The friction stir welding apparatus according to claim 1, further comprising a supplementary support mechanism that supports the mounting member by a support member to supplementarily support only a vertical position of the processing target member,
   wherein the supplementary support mechanism is fitted to the arm, and at a time of detecting the length of the member including the holder and the probe and the tip length of the probe, the welding tool is moved down so that the tip of the probe presses the upper surface side of the block member, and the support member supports the lower surface side of the block member.

4. The friction stir welding apparatus according to claim 1, further comprising a probe cleaning mechanism that cleans the probe,
wherein the probe cleaning mechanism has a roughing unit and a final polishing unit, and at a time of cleaning the probe, after the movement mechanism moves the arm so that the welding tool faces the roughing unit, the welding tool is moved down to accommodate the tip of the probe in the roughing unit, and the welding tool is rotated to rough the tip, and after the movement mechanism moves the arm so that the welding tool faces the final polishing unit, the welding tool is moved down to accommodate the tip of the probe in the final polishing unit, and the welding tool is rotated to polish the tip.

5. A friction stir welding apparatus comprising:
a mounting member on which a processing target member is mounted;
a welding tool having a probe, a holder having a coefficient of thermal expansion larger than that of the probe and holding the probe detachably, a drive mechanism that can drive the holder holding the probe to freely move the probe vertically with respect to a processing target side surface of the processing target member and can freely rotate with respect to the processing target member, and a detector that can freely detect a length of a member including the holder and the probe as the drive mechanism moves the holder holding the probe downward;
a movement mechanism having an arm to which a fitting jig fitted with the welding tool is fixed so as to be able to freely move the welding tool with respect to the processing target member by moving the arm; and
a probe detection mechanism that can freely detect a tip length, which is a length of a member of only the probe, as the drive mechanism moves the holder holding the probe downward,
wherein the detector can freely detect the amount of vertical movement of the holder and the probe held by the holder by the drive mechanism, and detects the amount of movement after the movement mechanism moves the arm so that the welding tool faces a mounting surface of the mounting member until the welding tool is moved down to press the mounting surface of the mounting member by the tip of the probe.

6. The friction stir welding apparatus according to claim 5, further comprising a supplementary support mechanism that supports the mounting member by a support member to supplementarily support only a vertical position of the processing target member,
wherein at a time of detecting the amount of movement after the movement mechanism moves the arm so that the welding tool faces the mounting surface of the mounting member until the welding tool is moved down to press the mounting surface of the mounting member by the tip of the probe, the welding tool is moved down to press the mounting surface of the mounting member by the tip of the probe and the support member supports an opposite side to the mounting surface of the mounting member.

7. A friction stir welding apparatus comprising:
a mounting member on which a processing target member is mounted;
a welding tool having a probe, a holder having a coefficient of thermal expansion larger than that of the probe and holding the probe detachably, a drive mechanism that can drive the holder holding the probe to freely move the probe vertically with respect to a processing target side surface of the processing target member and can freely rotate with respect to the processing target member, and a detector that can freely detect a length of a member including the holder and the probe as the drive mechanism moves the holder holding the probe downward;
a movement mechanism having an arm to which a fitting jig fitted with the welding tool is fixed so as to be able to freely move the welding tool with respect to the processing target member by moving the arm;
a probe detection mechanism that can freely detect a tip length, which is a length of a member of only the probe, as the drive mechanism moves the holder holding the probe downward;
a pressing member that can freely press the processing target member mounted on the mounting member; and
a processing-member detection mechanism having a displacement sensor fixed to the mounting member side,
wherein when the pressing member presses an upper surface of the processing target member, the contact member of the displacement sensor comes in contact with the pressing member side and is moved, thereby detecting an amount of displacement of the contact member.

8. The friction stir welding apparatus according to claim 7, wherein the processing target member has a lower member and an upper member, and when the pressing member presses an upper surface of the lower member mounted on the mounting member, the contact member of the displacement sensor comes in contact with the pressing member side and is moved, thereby detecting the amount of displacement of the contact member, or when the pressing member presses an upper surface of the upper member mounted on the lower member, the contact member of the displacement sensor comes in contact with the pressing member side and is moved, thereby detecting the amount of displacement of the contact member.

9. The friction stir welding apparatus according to claim 1, further comprising:
a probe cleaning mechanism that cleans the probe; and
a processing-member detection mechanism having a displacement sensor fixed to the mounting member side,
wherein the probe cleaning mechanism has a roughing unit and a final polishing unit, and at a time of cleaning the probe, after the movement mechanism moves the arm so that the welding tool faces the roughing unit, the welding tool is moved down to accommodate the tip of the probe in the roughing unit, and the welding tool is rotated to rough the tip, and after the movement mechanism moves the arm so that the welding tool faces the final polishing unit, the welding tool is moved down to accommodate the tip of the probe in the final polishing unit, and the welding tool is rotated to polish the tip, and
wherein the probe detection mechanism, the processing-member detection mechanism, the probe cleaning mechanism, and the processing target member mounted on the mounting member are arranged within a movable range of the welding tool defined by the movement of the arm by the movement mechanism.

10. The friction stir welding apparatus according to claim 1, wherein the movement mechanism is an industrial robot.

11. The friction stir welding apparatus according to claim 5, further comprising:
a probe cleaning mechanism that cleans the probe; and
a processing-member detection mechanism having a displacement sensor fixed to the mounting member side,
wherein the probe cleaning mechanism has a roughing unit and a final polishing unit, and at a time of cleaning the probe, after the movement mechanism moves the arm so that the welding tool faces the roughing unit, the welding tool is moved down to accommodate the tip of the probe in the roughing unit, and the welding tool is rotated to rough the tip, and after the movement mechanism moves the arm so that the welding tool faces the final polishing unit, the welding tool is moved down to accommodate the tip of the probe in the final polishing unit, and the welding tool is rotated to polish the tip, and wherein the probe detection mechanism, the processing-member detection mechanism, the probe cleaning mechanism, and the processing target member mounted on the mounting member are arranged within a movable range of the welding tool defined by the movement of the arm by the movement mechanism.

12. The friction stir welding apparatus according to claim 5, wherein the movement mechanism is an industrial robot.

13. The friction stir welding apparatus according to claim 7, further comprising a probe cleaning mechanism that cleans the probe, wherein the probe cleaning mechanism has a roughing unit and a final polishing unit, and at a time of cleaning the probe, after the movement mechanism moves the arm so that the welding tool faces the roughing unit, the welding tool is moved down to accommodate the tip of the probe in the roughing unit, and the welding tool is rotated to rough the tip, and after the movement mechanism moves the arm so that the welding tool faces the final polishing unit, the welding tool is moved down to accommodate the tip of the probe in the final polishing unit, and the welding tool is rotated to polish the tip, and wherein the probe detection mechanism, the processing-member detection mechanism, the probe cleaning mechanism, and the processing target member mounted on the mounting member are arranged within a movable range of the welding tool defined by the movement of the arm by the movement mechanism.

14. The friction stir welding apparatus according to claim 7, wherein the movement mechanism is an industrial robot.

* * * * *